Jan. 6, 1948.  F. G. FERGUSON ET AL  2,433,839
SHAFT SEAL
Filed July 4, 1944  2 Sheets-Sheet 1
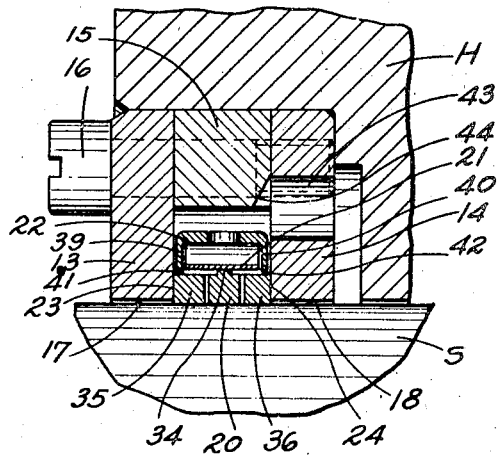
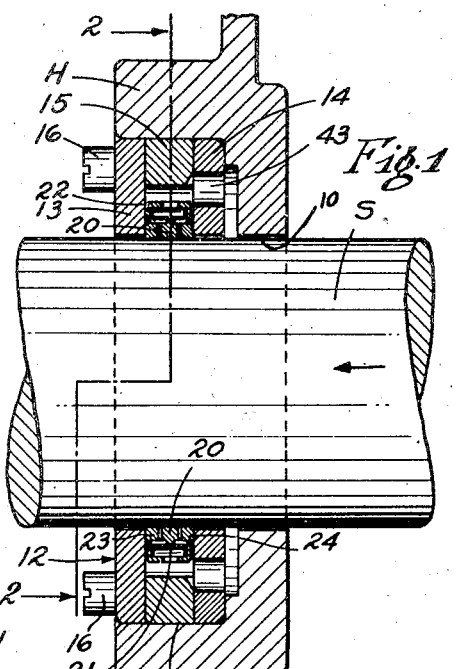
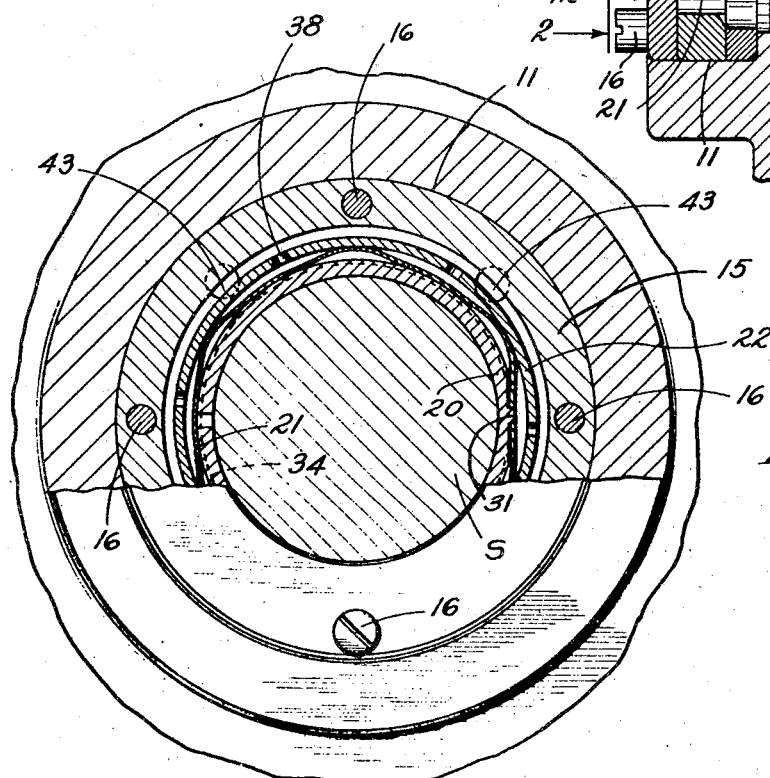
INVENTORS
FREDRICK G. FERGUSON
& RALPH C. THOMPSON
BY
Bosworth & Sessions
ATTORNEYS

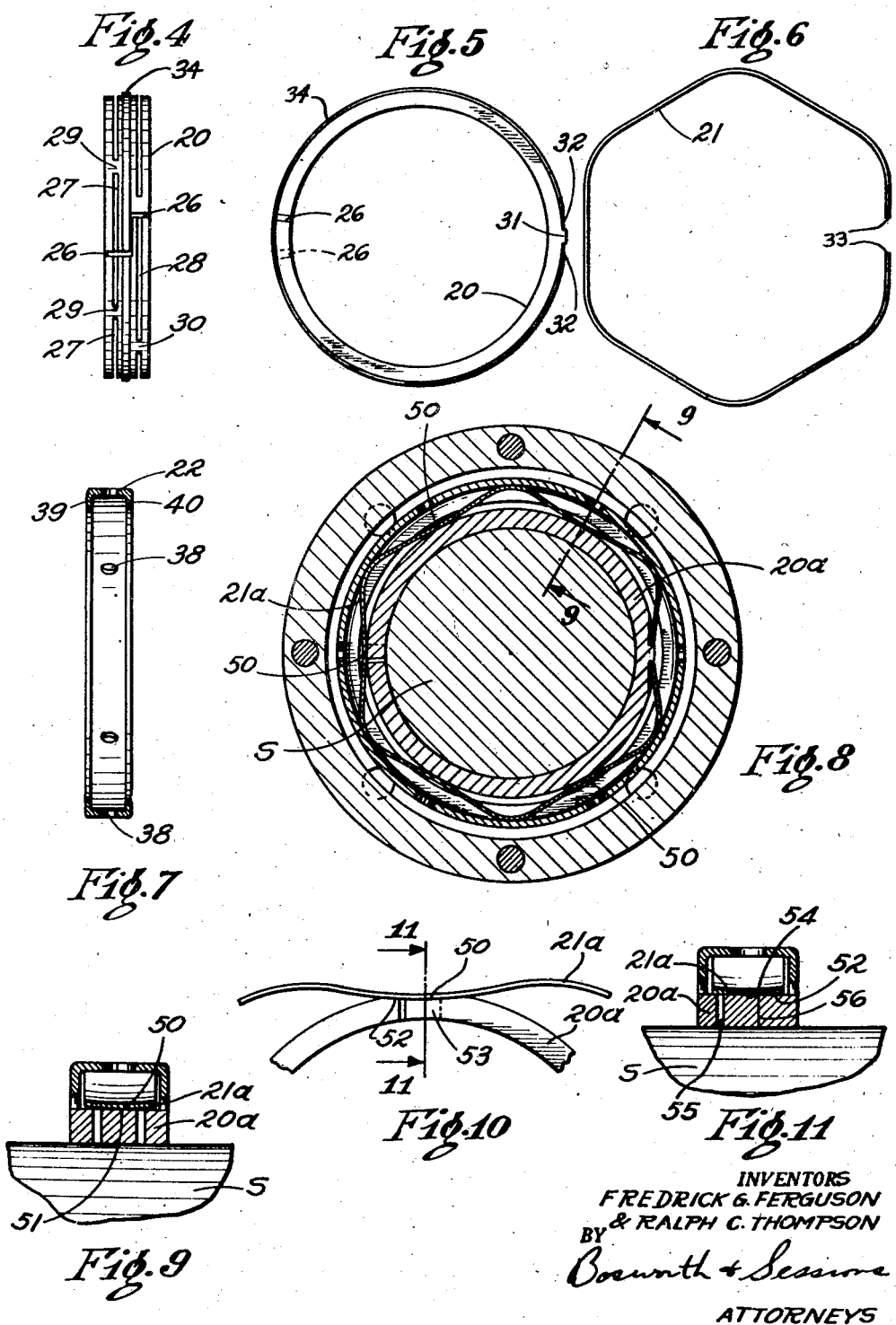

Patented Jan. 6, 1948

2,433,839

UNITED STATES PATENT OFFICE 2,433,839

SHAFT SEAL

Frederick G. Ferguson, Shaker Heights, and Ralph C. Thompson, Cleveland Heights, Ohio, assignors to Simplex Products Corporation, Cleveland, Ohio, a corporation of Ohio Application July 4, 1944, Serial No. 543,468

13 Claims. (Cl. 286—7)

1

This invention relates to seals for preventing fluid from passing along a rotating shaft where the shaft projects through an opening in a relatively stationary member such as a housing or the like. Heretofore, many such seals have been made of leather or flexible synthetic materials, and while such seals have been reasonably effective at low rotational speeds, they have not been satisfactory at the high speeds and under the severe operating conditions encountered in modern aircraft power plant installations. Much of the difficulty with existing types of leather and synthetic seals has been due to the fact that friction at high rotational speeds causes the seals to heat up excessively, resulting in damage to the sealing material. Existing seals have been short lived and a source of trouble when installed, for example on generator shafts of aircraft engines, which may operate at six or ten thousand revolutions per minute.

A general object of the present invention, therefore, is to provide a simple, durable and effective seal which will prevent substantial leakage along a rotating shaft and which will be long lived at high rotational speeds. Another object is to provide such a seal which can be constructed entirely of metal and wherein there will be little if any wear and very little tendency to heat up in service. Another object is to provide a seal of this character in which centrifugal force is utilized to assist in the sealing action in that the fluid being sealed is thrown back into the housing by the action of the centrifugal force. Another object is to provide a seal which will be effective even though there may be slight endwise play or vibration of the shaft with which the seal is associated. A further object is the provision of a light and compact seal of this character. Another object is the provision of an all-metal seal which can be substituted for the leather or synthetic seals heretofore used without requiring extensive changes in the design of the devices with which they are used.

Further objects and advantages of the invention will become apparent from the following description of preferred forms thereof, reference being made to the accompanying drawings in which Figure 1 is a sectional view showing a portion of a housing and a shaft extending therethrough, with a seal embodying the present invention disposed on the shaft; Figure 2 is a transverse sectional view taken along the line 2—2 of Figure 1; Figure 3 is an enlarged sectional detail showing a portion of the seal of Figures 1 and 2; Figure 4 is an end elevation of a preferred form of sealing

2 ring used in our seal; Figure 5 is a side elevation of the sealing ring of Figure 1; Figure 6 is an end elevation of the spring member which contracts the sealing ring into engagement with the shaft; Figure 7 is a sectional detail showing the channel member within which the contracting spring of Figure 6 is disposed; Figure 8 is a view similar to Figure 2, but showing a modified form of seal; Figure 9 is a fragmentary section as indicated by line 9—9 of Figure 8; Figure 10 is a fragmentary detail of the seal of Figure 8; and Figure 11 is a section as indicated by line 11—11 of Figure 10.

As shown in the drawings, the seal may be employed to block the flow of fluid through the clearance space between the shaft S and the housing H. The housing has an opening 10 through which the shaft extends, the opening being enlarged as at 11 to receive the seal assembly indicated generally at 12. The seal assembly preferably is arranged so that it may be handled as a unit and consists of a cage made up of annular members 13 and 14 spaced apart by the spacer ring 15, the whole assembly being secured together as by screws 16. The outer cylindrical surfaces of the members 13, 14 and 15 are dimensioned to have a press fit within the opening 11. If desired, these surfaces may be provided with a plating of lead, cadmium or other suitable material to insure a fluid tight connection. Thus fluid traveling along the shaft in the direction of the arrow is prevented from escaping from around the exterior of the cage by the sealing engagement of the cylindrical exterior surfaces of the interior of the opening 11 of the housing. Obviously, other means for making a leakproof connection between the housing and the cage may be employed. However, the simple press fit is adequate where moderate pressures are involved, and provides a compact and lightweight assembly particularly suited for use in aircraft. The unitary assembly can be easily substituted for leather or synthetic seals heretofore employed.

In order to prevent fluid from escaping from along the shaft through the clearance spaces between the openings 17 and 18 of the members 13 and 14 and the exterior of the shaft, we preferably employ a transversely split, axially resilient sealing ring 20 disposed within the cage as shown particularly in Figures 1 and 3. The ring, which will be described in greater detail below, is contracted into sealing engagement with the exterior of the shaft by a contracting spring 21 disposed within the channel member 22 and acting between the interior of the channel member and the exterior of the sealing rings to contract the sealing ring as indicated particularly in Figure 2. Thus the sealing ring is maintained in contact with the shaft against the effect of centrifugal force even at high rotational speeds, and leakage between the shaft and the sealing ring is prevented.

To block the remaining path for leakage of fluid, which is around the exterior of the sealing ring and within the cage, the sealing ring, which as noted above is axially resilient, is dimensioned to be compressed slightly in an axial direction when disposed within the cage. The ring therefore resiliently engages the inner faces of the members 13 and 14 as indicated at 23 and 24, respectively. The sealing ring 20 rotates at substantially the speed of the shaft while the members 13 and 14 are stationary, and the radial end faces of the ring engage the inner radial faces of the members 13 and 14 at 23 and 24 providing running seals which effectively prevent leakage of fluid at these points. The frictional engagement of the shaft and ring is preferably so related to the friction at these running seals that the sealing ring creeps slightly with respect to the shaft, rotating at slightly less speed than the shaft itself. With the frictional engagement between shaft and ring such that the ring can creep, the ring is also able to shift axially of the shaft to accommodate endwise displacement of the shaft with respect to the housing, so that the ring is properly centered in the cage. Excessive wear of the radial sealing surfaces is thus prevented.

Preferably, the sealing ring 20 is constructed generally in accordance with the prior patent of Dean M. Solenberger No. 1,574,634, issued February 23, 1926, and as shown in Figures 4 and 5 the ring is transversely split as at 26 and provided with two rows or series of saw cuts as at 27 and 28. These cuts or grooves 27 and 28 are arranged to leave small staggered intervening portions 29 and 30, providing a resilient structure which is very compact and which acts with substantially uniform force at all points in axial directions. Preferably these rings are composed of cast iron because of the desirable frictional characteristics of this material, but other suitable materials may be employed. It will be noted that the transverse cut 26 is stepped as shown particularly in Figure 5 to avoid the presence of a direct path through the sealing ring at this point, but under certain circumstances it may be perfectly satisfactory to employ a straight cut through the ring although there may be a slight seepage of fluid through the cut. While the sealing ring is like the piston ring of the above mentioned Solenberger patent in its axially resilient characteristics, it is of different design in that it is intended for sealing engagement on its interior rather than its exterior surface, and is designed to be contracted into sealing engagement whereas the piston ring is designed for expansion.

In order to properly locate the contracting spring 21 with respect to the sealing ring 20, the sealing ring is provided with a stop 31 preferably diametrically opposite the transverse cut 26. The stop is made by cutting away the material of the ring on either side thereof as at 32 to provide recesses to receive the ends 33 of the contracting spring 21 as shown particularly in Figure 2. To insure freedom of axial expansion and to prevent binding, the sealing ring may be provided with a central bead or ridge 34 extending around its exterior. As shown particularly in Figure 3, the contracting spring normally engages only the bead or ridge 34. Thus the outer portions 35 and 36 of the ring 20 are free to move axially with respect to the central portion without any friction or binding action being imposed thereon by the contracting spring 21. Proper sealing engagement at 23 and 24 is obtained by the resilient expansion of the ring 20, which makes a good running seal against the inner surfaces of the annular rings 13 and 14, these last rings preferably being composed of hardened steel with ground surfaces. Because of the good frictional characteristics of cast iron and steel, the sealing surfaces are not subjected to excessive wear and will not become overheated. However, if desired, the sealing ring may be plated with lead or other anti-friction metal to reduce the friction drag and improve the sealing characteristics, particularly during the initial operation of the seal.

As shown in Figure 6, the contracting spring 21 is preferably of polygonal shape and may be composed of thin spring steel. It is retained within the channel 22 (see Figure 7) which can conveniently be made of cold rolled steel or other suitable material. The channel is provided with openings 38 to prevent fluid from being trapped within it. There are preferably small clearance spaces between the spring 21 and the flanges 39 and 40 of the channel as indicated at 41 and 42, so that fluid will not be trapped by the contracting spring 21. If desired the spring 21 may be perforated to provide further passages for the flow of fluid through it.

In operation, except for the slow creeping noted above, the sealing ring 20, the contracting spring 21 and the channel 22 all rotate with the shaft while the cage made up of the members 13, 14 and 15 is stationary. The sealing ring is contracted into sealing engagement with the shaft and makes running sealing engagement with the members 13 and 14 at 23 and 24. The spring 21 is retained within the channel 22 and as the channel is narrower than the cage, there is no substantial frictional engagement between either of these parts and the interior surfaces of the cage. Because of the clearance between the members 13 and 14 and the shaft, the shaft is permitted to vibrate slightly without affecting the seal. Further, the axial resilience of the sealing ring permits slight axial vibration of the shaft while maintaining the seal, while greater axial movement of the shaft can be accommodated by sliding movement of the sealing ring with respect to the shaft.

Oil or other fluid seeking to travel outwardly along the shaft through the opening 10 is blocked from reaching the exterior of the housing around the outside of the cage by the press fit between the exterior of the cage and the opening 11. Leakage along the shaft is substantially prevented by the sealing ring, and the sealing engagement at the zones 23 and 24 prevents substantial leakage around the exterior of the sealing ring and within the cage. Oil leaking past the sealing surfaces at 24 will be thrown outwardly by centrifugal force either around the channel 22 or into the channel 22 and out through the openings 38, and then will be returned to the inner side of the seal through the openings 43 in the inner annular member 14. The spacing member 15 is chamfered as at 44 to permit oil to reach the openings 43. Oil in the space around the sealing ring and within the cage thus cannot reach the exterior of the seal except by passing through the sealing zone 23 inwardly toward the shaft and thus against the action of centrifugal force. Because of this action the seal is effective to prevent substantial leakage even though the sealing pressures between the sealing ring and the members 13 and 14 are relatively light. Thus friction may be held at a minimum because of the light sealing pressures, and thereby difficulties from wear and heating of the parts are substantially eliminated.

In Figures 8 to 11, we have illustrated a seal of slightly modified construction. The principles of operation, and the cage and the channel member 22 are the same as previously described, but the sealing ring 20a and contracting spring 21a are somewhat modified. As shown particularly in Figure 8, the spring 21a is provided with reverse bends engaging the ring 20a as indicated at 50. With such a construction, the operation of forming the reverse bends gives the portion of the spring engaging the sealing ring a slightly convex form in an axial direction at the bends, as shown particularly in Figure 9. Because of this transverse or axial curvature, the spring engages the sealing ring substantially in a circumferential line disposed in the central part of the sealing ring, the region of engagement being shown at 51 in Figure 9. Because of this narrow zone of engagement between the contracting spring and the sealing ring, the spring does not impair the axial resilience of the sealing ring even though the bead or ridge 34, shown on the ring 20 in the previous modification be eliminated. Thus the sealing ring 20a may be substantially rectangular in cross section as shown.

In this modification the ring 20a is ground to conform to the reverse curved portion 50 of the contracting spring 21a in the region adjacent the gap in the ring. This is illustrated on an enlarged scale in Figures 10 and 11 where it will be seen that the sealing ring is ground with a curve 52 conforming to the curved portion 50 of the contracting spring 21a in the region adjacent the stepped gap 53 of the sealing ring. As shown in Figure 11, the inner face of the contracting spring 21a is preferably ground flat at this point, providing a surface 54 which is flat in an axial direction, rather than convex. This surface 54 engages the surface 52 of the ring 20a as shown in Figure 11 and thus cuts down the leakage at the gap. In Figure 11, the space 55 indicates one of the saw cuts which give the ring resilience, while the line 56 indicates the circumferential part of the stepped gap in the ring. The presence of the contracting spring in intimate contact with the ring at this point prevents the flow of fluid in radial directions through the gap and thus cuts down leakage at this point. While the engagement between the contracting spring and the ring extends substantially throughout the width of the sealing ring and necessarily has some effect on the freedom of axial expansion and contraction of the ring, nevertheless this does not seem to effect the sealing action adversely, probably because the circumferential extent of the contacting area is relatively small.

It will be understood that if desired, the sealing ring 20 of the previously described modification may be ground in somewhat similar fashion to conform to the curvature of the contracting spring 21 in the previously described form of the invention. In such case, it would be necessary, of course, to grind off the ridge or bead 34 throughout this particular zone of contact. Also, the sealing ring 20 of the previous modification may be employed with a contracting spring embodying reverse bends as in the spring 21a.

From the foregoing description of preferred forms of the invention, it will be seen that we have provided simple, compact and effective seals for preventing leakage along rotating shafts. The nature of the seals is such that wear and heating are held at a minimum while leakage is substantially prevented. The seals can be manufactured economically and do not require special or critical materials. High sealing pressures are not required, and accordingly the seals operate for long periods of time with very small amounts of wear. The nature of the seals is such that reasonable amounts of vibration of the shaft may take place without damaging the seals or destroying their sealing action. The seals comprise compact unitary assemblies which can be handled and installed easily.

Various modifications and changes may be made in the invention without departing from the spirit or scope thereof. It is therefore to be understood that the foregoing description of preferred forms of the invention is given by way of example only and that our patent is not limited thereto or in any manner other than by the scope of the appended claims:

We claim:

1. A seal for preventing leakage of fluid between a rotating shaft and a housing having an opening through which the shaft extends, comprising a cage providing spaced annular opposed sealing surfaces, said cage being secured to the housing and surrounding the shaft, and a unitary, transversely split, axially resilient metallic ring disposed within the cage, said ring being rotatable substantially with the shaft and in sealing engagement therewith, said ring having radial end surfaces making a running seal with said annular surfaces of said cage, and means disposed within said cage and rotatable with said ring for urging said ring into sealing engagement with said shaft.

2. A seal for preventing leakage of fluid between a rotating shaft and a housing having an opening through which the shaft extends, comprising a cage providing spaced annular opposed sealing surfaces, said cage being secured to the housing and surrounding the shaft, and a transversely split, axially resilient metallic ring disposed within the cage, said ring being rotatable substantially with the shaft and in sealing engagement therewith, said ring having radial end surfaces making a running seal with said annular surfaces of said cage, and means disposed within said cage for urging said ring into sealing engagement with said shaft, said means including an annular member surrounding said ring and spaced therefrom, and a spring member acting between said annular member and said ring.

3. A seal for preventing leakage of fluid between a rotating shaft and a housing having an opening through which the shaft extends, comprising a cage providing spaced annular opposed sealing surfaces, said cage being secured to the housing and surrounding the shaft, and a transversely split, cast iron ring disposed within the cage, said ring being rotatable substantially with the shaft and in sealing engagement therewith, said ring being provided with staggered circumferential slots to impart axial resilience thereto and having radial end surfaces making a running seal with said annular surfaces of said cage, and means disposed within said cage for urging said ring into sealing engagement with said shaft, said means including a channel section annular member surrounding said ring and spaced therefrom, and a generally polygonal spring member acting between said annular member and said ring.

4. A seal for preventing leakage of fluid between a rotating shaft and a housing having an opening through which the shaft extends, comprising a cage providing spaced annular opposed sealing surfaces within it, said cage being secured to the housing and surrounding the shaft, a unitary axially resilient metallic ring disposed within the cage, said ring being rotatable substantially with the shaft and in sealing engagement therewith, said ring having oppositely disposed surfaces making running seals with said annular surfaces of said cage, and means for resiliently urging said ring into sealing engagement with said shaft.

5. A unitary seal assembly for preventing leakage of fluid between a rotating shaft and a housing having an opening through which the shaft extends, comprising a cage adapted to be secured to a housing in leakproof relationship and providing spaced opposed annular sealing surfaces within it, an axially resilient, transversely split metallic ring disposed within the cage and adapted to make sealing engagement and rotate at substantially the speed of a shaft, and having end surfaces adapted to make running seals with said annular sealing surfaces of said cage, an annular member disposed within said cage and spaced from and surrounding said sealing ring, there being clearance between said member and said cage, and a generally polygonal spring acting between said member and said sealing ring for urging said ring into sealing engagement with a shaft.

6. A unitary seal assembly for preventing leakage of fluid between a rotating shaft and a housing having an opening through which the shaft extends, comprising a cage adapted to be secured to a housing in leakproof relationship and providing spaced opposed annular sealing surfaces within it, a unitary axially resilient, transversely split metallic ring disposed within the cage and adapted to make sealing engagement and rotate substantially with a shaft, and having surfaces adapted to make running seals with said annular sealing surfaces of said cage, and spring means disposed within said cage and rotatable with said ring for urging said ring into sealing engagement with a shaft.

7. A seal for preventing leakage of fluid between a rotating shaft and a housing having an opening through which the shaft extends, said seal comprising a transversely split, axially resilient, one-piece metallic ring rotatable substantially with the shaft and in resilient sealing engagement therewith, said ring having a radial face making a running seal with a radial shoulder which is non-rotatable with respect to the housing.

8. A seal for preventing leakage of fluid between a rotating shaft and a housing having an opening through which the shaft extends, said seal comprising a unitary transversely split axially resilient metallic ring rotatable substantially with the shaft, said ring having a radial face making a running seal with a radial shoulder which is non-rotatable with respect to the housing, and resilient means surrounding said ring and urging it into sealing engagement with said shaft.

9. A seal for preventing leakage of fluid between a rotating shaft and a housing having an opening through which the shaft extends, said seal comprising a transversely split, axially resilient metallic ring rotatable substantially with the shaft and in sealing engagement therewith, said ring having a radial face making a running seal with a radial shoulder which is sealed to the housing, and means surrounding said ring and urging it into sealing engagement with said shaft, said means including a rigid annular member surrounding said ring and spaced radially therefrom and a polygonal spring member acting between said annular member and said ring.

10. In a seal for preventing leakage of fluid between a rotating shaft and an opening through which the shaft extends, a split metallic ring surrounding the shaft and in sealing engagement therewith, said ring being provided with two rows of staggered circumferential slots to impart axial resilience thereto, and a contracting spring surrounding said ring and urging it into sealing engagement with said shaft, said spring engaging only the portion of said ring between said rows of slots, whereby the axial resilience of said ring is not substantially impaired by the action of said spring.

11. In a seal for preventing leakage of fluid between a rotating shaft and an opening through which the shaft extends, a one piece split metallic ring in sealing engagement with the shaft, said ring being provided with two rows of staggered circumferential slots to impart axial resilience thereto and having an outwardly projecting circumferential bead disposed between said rows of slots and spring means surrounding said ring and urging it into sealing engagement with said shaft, said spring means including a flat spring member acting against said circumferential bead on said ring, whereby the axial resilience of said ring is not substantially impaired by the action of said spring.

12. In a seal for preventing leakage of fluid between a rotating shaft and an opening through which the shaft extends, a split axially resilient cast iron ring surrounding the shaft and in sealing engagement therewith, said ring being provided with two rows of staggered circumferential slots to impart axial resilience thereto and a spring surrounding said ring and urging it into sealing engagement with said shaft, spaced portions of said spring engaging said ring, the surfaces of said spring engaging said ring being convex and the diameter of the portion of said ring between said slots being at least as great as the diameter of the end portions of said ring, whereby said spring member engages said ring only in the portion thereof between said slots and whereby the axial resilience of said ring is not substantially impaired by the action of said spring.

13. In a seal for preventing leakage of fluid between a rotating shaft and an opening through which the shaft extends, an axially resilient seal ring surrounding the shaft and in sealing engagement therewith, said ring having a stepped joint therein, and means surrounding said ring for urging it into sealing engagement with said shaft, said means including a rigid annular member surrounding said ring and spaced radially therefrom, and a generally polygonal spring member acting between said annular member and said ring, said spring member engaging said ring adjacent said stepped joint therein and the surfaces of said spring member and said ring at the zone of engagement adjacent said stepped joint being shaped substantially to conform to each other whereby leakage of fluid through said stepped joint is substantially eliminated.

FREDRICK G. FERGUSON.
RALPH C. THOMPSON.

REFERENCES CITED

The following references are of record in the file of this patent:

UNITED STATES PATENTS

| Number | Name | Date |
|---|---|---|
| 833,273 | Westinghouse | Oct. 16, 1906 |
| 1,927,507 | Sommers et al. | Sept. 19, 1933 |
| 2,348,939 | Thompson | May 16, 1944 |
| 976,369 | Hugh | Nov. 22, 1910 |
| 2,367,403 | Kosatka | Jan. 16, 1945 |

FOREIGN PATENTS

| Number | Country | Date |
|---|---|---|
| 699,736 | Germany | 1940 |
| 19,968 | Great Britain | 1909 |